No. 869,906. PATENTED NOV. 5, 1907.
A. I. JACOBS.
UNIVERSAL JOINT.
APPLICATION FILED DEC. 19, 1906.
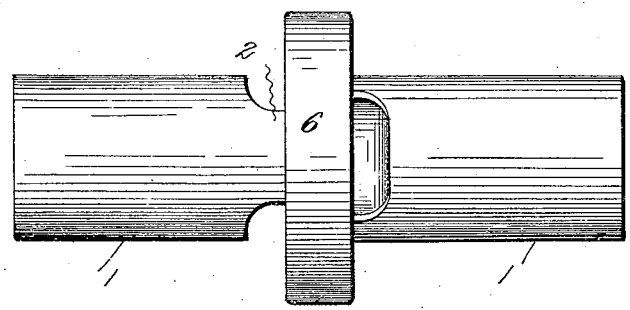
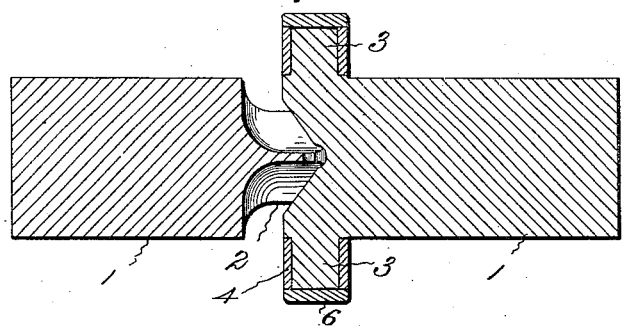
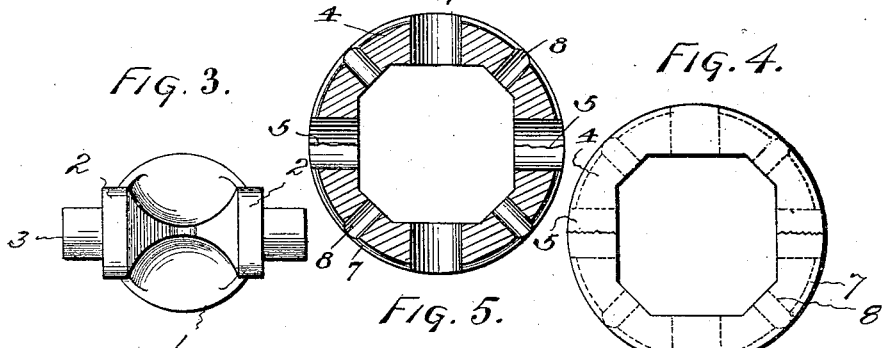
WITNESSES:
S. S. Grotta.
Lena C. Berry
INVENTOR:
Arthur I. Jacobs
PER
Harry R. Williams
ATTORNEY.
THE NORRIS PETERS CO., WASHINGTON, D. C.

UNITED STATES PATENT OFFICE.

ARTHUR I. JACOBS, OF HARTFORD, CONNECTICUT, ASSIGNOR TO THE JACOBS MANUFACTURING COMPANY, OF HARTFORD, CONNECTICUT, A CORPORATION OF CONNECTICUT.

UNIVERSAL JOINT.

No. 869,906.

Specification of Letters Patent.

Patented Nov. 5, 1907.

Application filed December 19, 1906. Serial No. 348,531.

*To all whom it may concern:*

Be it known that I, ARTHUR I. JACOBS, a citizen of the United States, residing at Hartford, in the county of Hartford and State of Connecticut, have invented a new and useful Universal Joint, of which the following is a specification.

This invention relates to a flexible joint for coupling the ends of journals, shafts or axles which extend at an angle to one another.

The object of the invention is the production of a flexible coupling or universal joint which is very simple to manufacture and to assemble, which has few parts and has no screws, studs or pins that can possibly work loose, and in which the driving strains are near the periphery thereby producing a strong structure having comparatively little wear upon the moving parts.

The embodiment of the invention which is illustrated in the accompanying drawings has a pair of similar body members provided with ears having outwardly extending hubs or trunnions which extend into radial sockets in a broken ring that is held together by an encircling band.

Figure 1 of the drawings shows a side view of the joint. Fig. 2 shows a central longitudinal section of same. Fig. 3 is a view of one end of the body member. Fig. 4 is a face view of the broken ring, Fig. 5 is a face view of the ring inclosing band. Fig. 6 shows a sectional plan of the broken ring and Fig. 7 shows an edge view of one section of the broken ring.

The body members of the form of joint illustrated are duplicates, although of course they are not necessarily so. Each of these members has a cylindrical section 1 shaped for connection with the end of a shaft, journal or axle. Extending from opposite sides at one end of each member are ears 2, and projecting radially from the ears are hubs or trunnions 3. It is preferred that these trunnions be integral with the body although of course this is not necessary to the invention. The ends of the bodies between the ears are so recessed that they will fit together yet work freely. These two parts when put together are inclosed by a ring 4 which has its inner walls shaped to fit the ears and has sockets to receive the trunnions. This ring is broken, as at 5, through opposite trunnion sockets so it can be separated and placed about the ears with the trunnions in their respective sockets. After this ring is set together a band 6 is slipped upon the split ring so as to inclose it and hold the parts together.

In the periphery of the broken ring is a groove 7 and extending from the interior of the ring and opening into this groove are passages 8. These provide a ready means for applying lubricant to the joint.

When the trunnions are formed integral, whether the bodies are drop forgings or are turned down from solid blocks, there are but four simple parts to the joint and there is no possible chance for any of the parts to work loose. The trunnions however can be formed of separate studs screwed, brazed, sweated, riveted or otherwise fastened into the bodies, and in this case they can not work loose for the reason that they are closely held by the ring and the inclosing band.

This invention makes possible a joint without a loose pin or screw thread of any kind at any place. The parts are all simple to make and they are very quickly assembled by merely encircling the ends of the bodies with the broken ring and then sliding upon it the inclosing and fastening band. There are no screws to get loose and break off and no threads to cut. There is no tendency for the band to release the ring for all strain that it is required to withstand is at right angles to the direction in which it must move to work off. Furthermore the torsional pressure of the trunnions when driving is exerted out beyond the periphery of the bodies so that the parts are strong and any tendency of the trunnions to spread the ring merely causes it to bind the tighter in the band.

The invention claimed is:—

1. A flexible joint comprising a pair of complementary body members each provided with a pair of integral trunnions that project radially outward in opposite directions, a broken ring encircling the ends of the bodies and having sockets receiving the trunnions, and a band encircling and holding the ring intact, substantially as specified.

2. A flexible joint comprising a pair of complementary body members each provided with a pair of trunnions that project radially outward in opposite directions, a ring encircling the ends of the bodies and having sockets receiving the trunnions, said ring being broken through diametrically opposite trunnion sockets, and a band encircling and holding the ring intact, substantially as specified.

ARTHUR I. JACOBS.

Witnesses:
HARRY R. WILLIAMS,
LENA C. BERRY.